(12) United States Patent
Lutze et al.

(10) Patent No.: US 7,000,942 B2
(45) Date of Patent: Feb. 21, 2006

(54) METHOD FOR INTRODUCING A LINE OF WEAKENING WITH LOW TEARING RESISTANCE INTO AN AIRBAG COVER AND AIRBAG COVER PRODUCED BY THIS METHOD

(75) Inventors: Walter Lutze, Drackendorf (DE); Frank Steinhaeuser, Magdala (DE); Martin Griebel, Jena (DE); Norbert Preuss, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 229 days.

(21) Appl. No.: 10/461,232

(22) Filed: Jun. 13, 2003

(65) Prior Publication Data

US 2003/0230875 A1    Dec. 18, 2003

(30) Foreign Application Priority Data

Jun. 14, 2002    (DE)    ................................ 102 27 118

(51) Int. Cl.
 *B60R 21/20* (2006.01)
 *B29C 71/04* (2006.01)
 *B23K 26/38* (2006.01)

(52) U.S. Cl. .............. 280/728.3; 264/400; 219/121.69; 219/121.71

(58) Field of Classification Search ............. 280/728.3, 280/732, 752; 219/121.68, 121.69, 121.7, 219/121.71; 264/400
See application file for complete search history.

(56) References Cited

U.S. PATENT DOCUMENTS

| | | | |
|---|---|---|---|
| 5,738,367 A | | 4/1998 | Zichichi et al. |
| 6,113,131 A | * | 9/2000 | Uehara et al. ........... 280/728.3 |
| 6,247,722 B1 | | 6/2001 | Brodi, Jr. et al. |
| 6,337,461 B1 | | 1/2002 | Yasuda et al. |

FOREIGN PATENT DOCUMENTS

| | | |
|---|---|---|
| DE | 195 40 563 | 5/1997 |
| DE | 196 36 429 | 11/1997 |
| DE | 196 36 428 | 3/1998 |
| DE | 100 48 636 | 4/2002 |
| EP | 0 711 627 | 5/1996 |

* cited by examiner

*Primary Examiner*—Peter C. English
(74) *Attorney, Agent, or Firm*—Reed Smith LLP

(57) ABSTRACT

A method for introducing a line of weakening with a low opening resistance in an airbag cover, comprising a substrate layer, a foamed material layer and a decorative layer in which a row of pocket holes s generated by laser radiation, wherein, alternately, first groups of pocket holes with a length a and with a quantity x of shallow pocket holes are generated only in the substrate material and second groups of pocket holes with a length b and with a quantity y of deep pocket holes are generated through the substrate material and through the foamed material layer into the decorative layer, and the foamed material layer is retained in the area of the first groups of pocket holes as a supporting layer.

7 Claims, 3 Drawing Sheets

$y = 5$
$x = 5$

"PRIOR ART"

y = 5
x = 5 y = 6
x = 4 y = 6
x = 4 y = 4
x = 3 y = 4
x = 6 y = 10
x = 10

METHOD FOR INTRODUCING A LINE OF WEAKENING WITH LOW TEARING RESISTANCE INTO AN AIRBAG COVER AND AIRBAG COVER PRODUCED BY THIS METHOD

CROSS-REFERENCE TO RELATED APPLICATION

This application claims priority of German Application No. 102 27 118.6, filed Jun. 14, 2002, the complete disclosure of which is hereby incorporated by reference.

BACKGROUND OF THE INVENTION

1. Field of the Invention

The invention is directed to method for producing a line of weakening by means of a laser such as is known from DE 196 36 429 C1 and to an airbag cover produced by this method.

2. Description of the Related Art

The invention is directed to method for producing a line of weakening by means of a laser such as is known from DE 196 36 429 C1 and to an airbag cover produced by this method.

The prior art discloses many airbag covers (hereinafter: cover) designed and produced in different ways. All of them have the object of safely preserving and protecting the airbag and, in case of activation of the airbag, releasing within milliseconds an opening through which the airbag can deploy and protect the passengers of the vehicle.

The trend in recent years has tended toward covers which are not visible to the passengers. Such covers are produced in that a line of weakening which defines the subsequent opening is generated in the cover (which generally comprises a rigid substrate layer, a foamed material layer and a trim layer or decorative layer) or in individual layers of the cover.

The difficulties involved in generating such lines of weakening with different techniques are discussed in EP 0 711 627 A2. It is mentioned that the scoring depth of the line of weakening must be carefully controlled in order to cause a reliable rupture of the outer cover layer (decorative layer) at exactly the right moment. On the one hand, the depth of the score should not be too shallow so that the resistance to be overcome in opening is not too great; on the other hand, sufficient material should remain so that the line of weakening is not outwardly visible. It is also mentioned that in cover layers having an irregular inner surface the scoring depth must be controlled in such a way that the remaining residual wall thickness is constant. By way of solving this problem, it is suggested in EP 0 711 627 A2 that a continuous groove be cut in by means of a laser beam, this laser beam being controlled to achieve a constant thickness of the material remaining below the groove and to achieve a constant groove depth.

In order to generate lines of weakening with different resistance to opening, the groove can be generated with different depths. At all of the depths mentioned by way of example, the substrate layer is completely penetrated and the foamed material layer is penetrated at least partially or is penetrated completely into the decorative layer. Since the groove is continuous in every case, excepting the above-mentioned alternative line of through-holes, which anyway does not meet the object of invisibility of the line of weakening, the residual wall thickness remaining below the groove can not be minimized to an unlimited extent for minimizing the opening resistance because otherwise the groove would be visible due to the residual material sinking into the groove. To the extent that the foamed material layer should be at least partially retained as a supporting layer for the decorative layer, no weakening of the decorative layer can take place. However, for more robust foils, it is necessary that these be weakened because otherwise the tearing force required would be too great. In order to weaken the foil, it is mandatory that the supporting foamed material layer in the area of the groove be completely removed, and the decorative layer will sink into the groove over the course of time even when the decorative layer is weakened only slightly.

The basic idea of retaining the foamed material layer as a supporting layer for the decorative foil in the area of the line of weakening leads to the idea of forming the line of weakening by means of blind holes or pocket holes.

DE 196 36 429 C1 describes the advantages of a line of weakening produced by removal of material to form pocket holes:

1. Whereas only the residual wall thickness in the cut joint (continuous groove) can be varied as a geometric quantity for influencing the opening resistance when the line of weakening is produced by incision (described, e.g., in EP 0 711 627 A2), the width of the bridging material or web remaining between the pocket holes can be varied effectively in the case of a succession of pocket holes (perforation line).

2. When material is removed in the form of a cut line, the residual material must be thick enough or strong enough that it does not sink into the cut joint and thus become visible. With the perforation line, this sinking in is prevented, even when the residual wall thickness is smaller, by the webs which remain between the pocket holes and which act as supports.

3. A tearing resistance which is constant along the entire perforation line can also be achieved when the pocket holes have different residual wall thicknesses that are repeated periodically.

The generation of pocket holes of different residual wall thickness is based on the idea that small residual wall thicknesses and narrow webs can lead to intense thermal loading, as a result of which, as with material fatigue due to aging, the residual material sinks into the pocket holes so that the line of weakening becomes visible. In order to prevent this, material removal is carried out while periodically changing to different depths in the decorative layer. At shallower depths, the widths of the webs remaining in the foamed material layer are appreciably greater and there is less thermal loading of the decorative layer. The risk of visibility is improved with only a slight increase in the tearing resistance.

However, as tests have shown in practice, the selected spacing of the pocket holes penetrating into the decorative layer must be very large so that a web of foamed material is actually maintained. The radiation energy needed for the removal of the substrate layer and decorative layer is so high that the foamed material layer burns copiously around the pocket hole. However, as a result of the large spacing between the pocket holes, particularly when using more robust materials for the decorative layer, the required opening force is excessive.

Both of the solutions presented above are compromises between the smallest possible residual wall thickness and a small web width so as to keep the opening resistance of the line of weakening low on the one hand and the residual wall thickness and web width sufficiently large on the other hand so that the line of weakening is not visible to the passengers.

DE 195 40 563 A1 shows an instrument panel for motor vehicles which is overlain by a foil and has an integrated airbag door. The foil (decorative layer) has a line of weakening formed by a row of perforation holes which completely penetrate the material. The inventive idea in this solution consists in reducing the visibility of the line of weakening by covering the line of weakening with a laser-treated track.

Again, with the aim of generating an invisible line of weakening, it is suggested in DE 196 36 428 A1 to generate a line of weakening which alternates with the actual predetermined breaking line and is similar to the surface structure of the detector layer. (In the solutions mentioned above, the line of weakening leads over the same line as the predetermined breaking line.)

The last two solutions mentioned above require higher expenditure with respect to apparatus and technique as well as longer cutting times. Invisibility is forfeited for the sake of a low opening resistance which can best be achieved by means of a through perforation. However, this is again produced by superimposing a second laser line which makes the line of weakening "disappear" or by a line which is hardly visible in the surface.

OBJECT AND SUMMARY OF THE INVENTON

It is the primary object of the invention to provide a method in which a line of weakening is introduced in an airbag cover by means of a laser, the opening resistance of the line of weakening is appreciably lower compared to the lines of weakening which are produced by conventional methods and in which there is no through-perforation, and yet the line of weakening is much harder to see.

It is a further object of the invention to show an airbag cover with an integrated line of weakening which releases an opening for passage of the airbag when acted upon by only a slight opening force and in which the integrated line of weakening is invisible or hardly visible to the passengers of the vehicle.

This object is met for a method for introducing a line of weakening with a low opening resistance in an airbag cover according to the invention in that, alternately, first groups of pocket holes with a length a and with a quantity x of shallow pocket holes 4.1 are generated only in the substrate material 1 and second groups of pocket holes with a length b and with a quantity y of deep pocket holes 4.2 are generated through the substrate material 1 and through the foamed material layer 2 into the decorative layer 3 and the foamed material layer is retained in the area of the first groups of pocket holes as a supporting layer.

The objects of the invention are met for an airbag cover with a line of weakening having a low opening resistance according to the invention in that the arrangement of the pocket holes 4 comprises alternately arranged first groups of pocket holes with a length a and a quantity x of shallow pocket holes 4.1 and second groups of pocket holes of a length b and quantity y of deep pocket holes 4.2, and the shallow pocket holes 4.1 only project into the substrate material 1 and the deep pocket holes 4.2 project through the substrate material 1 and foamed material layer 2 into the decorative layer 3, so that the foamed material layer 2 remains in the area of the first groups of pocket holes as a supporting layer.

The prior art shows that it is very difficult to combine the seemingly conflicting demands for a small opening resistance of the line of weakening on the one hand and for invisibility of the line of weakening on the other hand. Only the last two solutions mentioned above can satisfy both conditions, but at an unacceptably high expenditure. The invention essentially consists in the idea of reducing the opening resistance of the line of weakening while increasing the remaining foamed material volume acting as a support in that alternating weakened areas are formed instead of a uniform weakening along the line of weakening.

For this purpose, according to the invention, a row of pocket holes is generated by a laser beam in an airbag cover comprising a substrate layer, a foamed material layer and a decorative layer, wherein alternately first groups of pocket holes comprising a plurality of shallow pocket holes are generated only in the substrate material and second groups of pocket holes are generated which comprise a plurality of deep pocket holes passing through the substrate material and the foamed material layer into the decorative layer. Visibility is also reduced because the weakening of the decorative layer is not continuous along the line of weakening, but rather is carried out only in a dotted or dashed manner.

The shallow pocket holes penetrate the substrate material substantially or completely. A small remaining residual wall thickness of the substrate material hardly increases the required opening force because the material is essentially brittle and breaks easily. A small residual wall thickness of the substrate material is advantageous in that the foamed material layer is hardly thermally loaded and is therefore retained in its entirety. The pocket holes can be generated next to the other with a web remaining therebetween, or can be introduced in an overlapping manner to the extent that the overlap forms an almost continuous cut in the substrate layer. The quantity of shallow pocket holes, their center-to-center distance, or center spacing, and depth can be selected depending on material.

The deep pocket holes extend through the substrate layer and foamed material layer to below the surface of the decorative layer. In contrast to the first two prior art solutions mentioned above, maintaining a defined residual wall thickness is of secondary importance because the defined opening behavior in this solution is essentially determined by the pattern of the groups of pocket holes determined by the respective quantity of pocket holes and their spacing or degree of overlap. The length of the second group of pocket holes is advantageously greater than the length of the first group of pocket holes. It is essential to the invention that, in contrast to the solution described in DE 196 36 429 C1, the supporting foamed material layer does not remain as webs between the individual pocket holes, but as a foamed material bridge above the first groups of pocket holes formed of shallow pocket holes. The deep pocket holes of the second groups of pocket holes can be generated closer together because no web of foamed material needs to be retained between them. The closer to one another they are arranged, the lower the required opening force, even though between the individual second groups of deep pocket holes the decorative layer is not weakened at all over the length of a first group of shallow pocket holes.

The invention will be explained more fully in the following in several embodiment examples with reference to the drawings.

DESCRIPTION OF THE PREFERRED EMBODIMENTS

Figure 1:
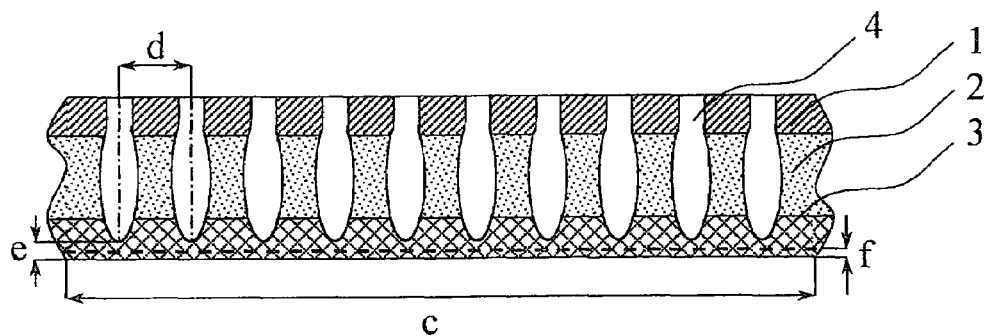
FIG. 1 shows a line of weakening produced according to the prior art.

In order to facilitate understanding of the invention, FIG. 1 shows a sectional view of an airbag cover with weakening according to the prior art, comprising a substrate layer 1, a foamed material layer 2 and a decorative layer 3. The section extends through a line of weakening formed by a plurality of pocket holes 4 arranged in a line. The material for the substrate layer 1 can be any material usually used for this purpose such as polypropylene (PP), with or without fiber glass reinforcement, or molded wood materials. The decorative layer 3 can, for example, be made of thermoplastic polyolefin (TPO), polyurethane (PU), polyvinyl chloride (PVC) or another material commonly used for this purpose in the automotive industry.

The section along length c shows ten pocket holes 4 with a center spacing d and a respective residual wall thickness e below the pocket holes 4 in the decorative layer 3. The selected center spacing d should be as small as possible so that a minimum web remains in the foamed material layer, i.e., if the center spacing d were further reduced in order to reduce the necessary tearing force, the webs would disappear due to the larger volume of the foamed material layer 2 that is removed compared to the volume of material removed in the substrate layer 1 and decorative layer 3. The smaller the residual wall thickness e, the greater the sink-in depth f. A reduction in tearing force caused by a reduction in center spacing d (the supporting foamed material webs completely disappear) and/or in the residual wall thickness e results in a greater sinking in of the decorative layer 3 over the length of the line of weakening with an increasing sink-in depth f.

Figure 2:
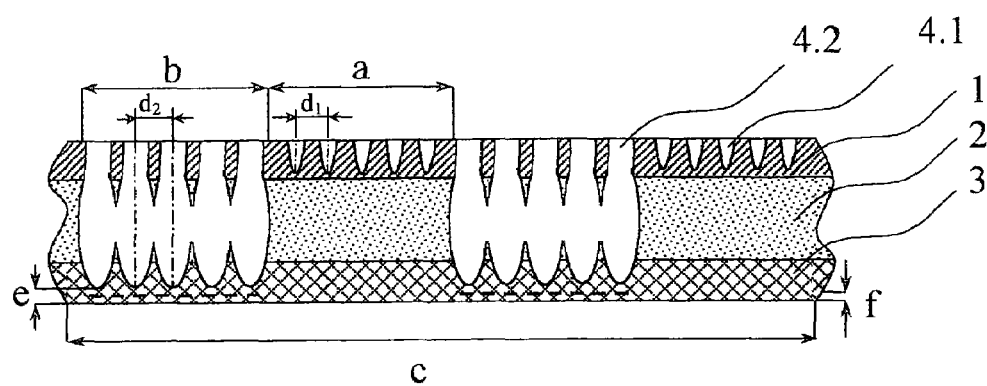
FIG. 2 shows a first embodiment example for a line of weakening produced according to the invention.

In an airbag cover of similar construction, FIG. 2 shows a first embodiment example for a line of weakening introduced, according to the invention, along the same section length c as in FIG. 1.

The pocket holes 4 are again arranged next to one another on a line, but extend to different depths in the airbag cover, either only into the substrate layer 1 or into the decorative layer 3. The selected center spacing d (hereinafter $d_1$ and $d_2$) in FIG. 2 is halved compared to FIG. 1, so that the same quantity of pocket holes 4 is introduced in the decorative layer 3 as in the prior art shown in FIG. 1. In the rest of the description, the pocket holes 4 extending into the decorative foil 3 are referred to as deep pocket holes 4.2 and the pocket holes 4 which extend only into the substrate layer 1 are referred to as shallow pocket holes 4.1. The shallow pocket holes 4.1 located next to one another in a quantity x form a first group of pocket holes of length a, while the deep pocket holes 4.2 located next to one another in a quantity y form a second group of pocket holes of length b. In the example shown in FIG. 2, x and y equal five. Since the same amount was selected for the center spacing $d_1$ of the shallow pocket holes 4.1 as for the center spacing $d_2$ of the deep pocket holes 4.2, the lengths a and b are also the same.

As tests have shown, with the same material composition of the airbag cover and with a residual wall thickness e below the deep pocket holes 4.2 equal to the residual wall thickness e of the solution according to the prior art, the necessary tearing force for the first embodiment example and that for the solution shown in the prior art are almost identical. However, a possible sinking of the decorative layer 3 into the line of weakening (shown as a dashed line in the drawings) is limited to the portions of the length b, since the foamed material layer 2 is maintained undamaged along the portions of length a as a supporting layer, and the line of weakening is therefore invisible or poorly visible to the human eye.

Figure 3:
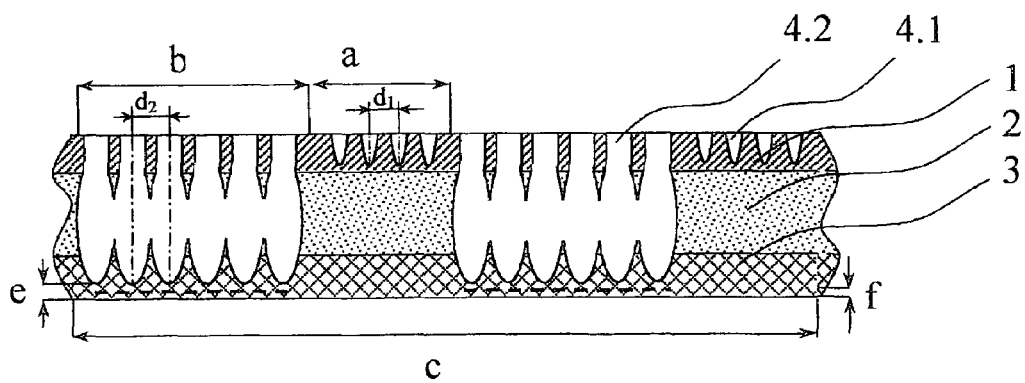
FIG. 3 shows a second embodiment example for a line of weakening produced according to the invention.

An appreciable reduction in tearing force is achieved according to a second embodiment example shown in FIG. 3 when the quantity y of deep pocket holes 4.2 is increased and the quantity x of shallow pocket holes 4.1 is reduced while retaining the center spacing $d_1$ and $d_2$. The visibility of the line of weakening changes at most negligibly compared to the first embodiment example in spite of the reduced tearing force.

FIGS. 4 to 7 show further embodiment examples which differ in the choice of center spacing $d_1$ and $d_2$, length a and b of the groups of pocket holes or the ratio of the quantity x of shallow pocket holes 4.1 to the quantity y of deep pocket holes 4.2. They are advantageously suited to a greater or less extent depending on the material composition of the airbag cover. Accordingly, with respect to materials for the decorative layer 3 with a higher resistance to tearing, a construction is selected in which the decorative layer 3 is weakened by a smaller center spacing $d_2$ and/or a higher quantity y of deep pocket holes 4.2, while with respect to the materials for the substrate layer 1 with a higher breaking strength the center spacing $d_1$ is reduced and/or the quantity x of shallow pocket holes 4.1 is increased. Depending on the tearing resistance of the decorative layer 3 (determined by the thickness and material characteristics of the decorative layer 3) and the breaking strength of the substrate layer 1 (determined by thickness, shape and material characteristics of the substrate layer 1), the person skilled in the art can shift the weakening of the airbag cover more to the weakening of the substrate layer 1 or more to the weakening of the decorative layer 3.

Figure 4:
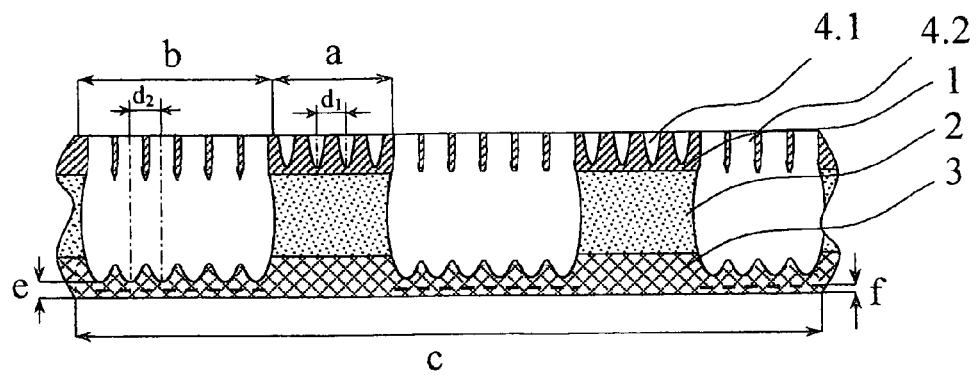
FIG. 4 shows a third embodiment example for a line of weakening produced according to the invention.

In the third embodiment example shown in FIG. 4, the center spacing $d_2$ of the deep pocket holes 4.2 is reduced compared to the second embodiment example (FIG. 3), so that the deep pocket holes 4.2 formed in the decorative layer 3 merge into one another and weaken the decorative layer 3 to a greater extent. Therefore, this construction is especially suitable for airbag covers with a decorative layer 3 with high tearing strength.

Figure 5:
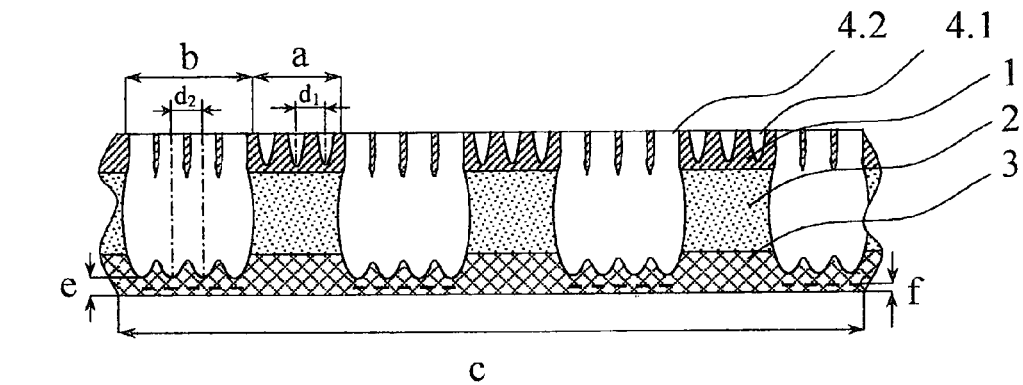
FIG. 5 shows a fourth embodiment example for a line of weakening produced according to the invention.

FIG. 5 shows a fourth embodiment example in which the lengths a and b of the groups of pocket holes were shortened compared to the third embodiment example in that the quantity y of deep pocket holes 4.2 was reduced to four and the quantity x of the shallow pocket holes 4.1 was reduced to three. This embodiment example has proven to be particularly advantageous, e.g., for an airbag cover with a substrate layer 1 of Polycarbonat Acryl-Nitril-Butadien-Styrol (PC-ABS) having a thickness of 3 mm, a foamed material layer 2 having a thickness of 9 mm and a decorative layer 3 of TPO having a thickness of 1.2 mm or for an airbag cover with a substrate layer 1 of PP having a thickness of 3 mm, a foamed material layer 2 having a thickness of 7 mm and a PU sprayed skin as decorative layer 3 with a thickness of about 1 mm.

Figure 6:
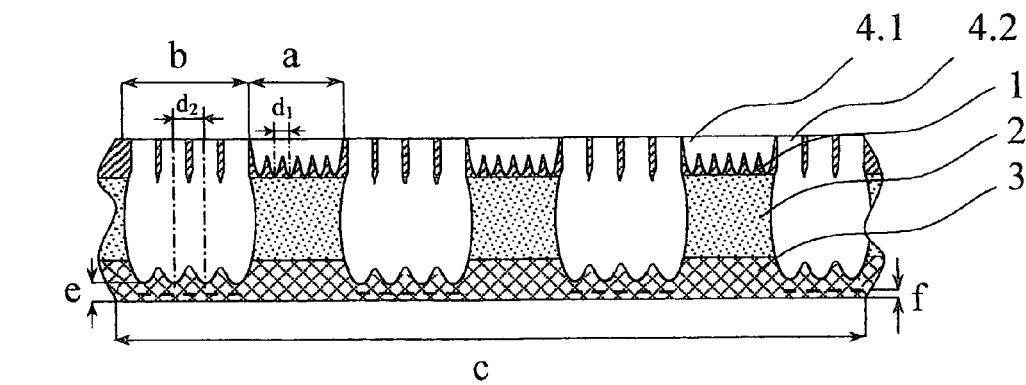
FIG. 6 shows a fifth embodiment example for a line of weakening produced according to the invention.

FIG. 6 shows a fifth embodiment example in which the substrate layer 1 is weakened to a greater extent compared with the previous examples by reducing the center spacing $d_1$ and accordingly introducing a greater quantity x of shallow pocket holes 4.1 along length a. This example is correspondingly advantageous when the substrate layer 1 has a high breaking strength.

Figure 7:
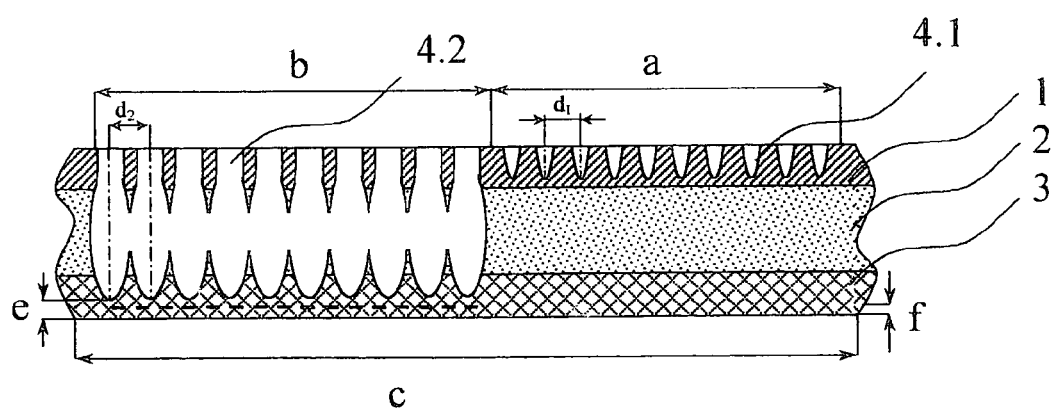
FIG. 7 shows a sixth embodiment example for a line of weakening produced according to the invention.

In a sixth embodiment example according to FIG. 7, the lengths a and b of the groups of pocket holes were increased by doubling the quantity y of deep pocket holes 4.2 and the quantity x of shallow pocket holes 4.1. This construction has proven especially advantageous for airbag covers with a foamed material layer 2 greater than 10 mm.

Note that in any one of the embodiments, the deep pocket holes are generated up to a residual wall thickness (e) in the decorative layer of less than one tenth of a millimeter.

In order to generate the line of weakening, a pulsed laser with a pulse frequency of up to 5000 Hz and a laser output of up to 2 kW is directed to the airbag cover as in the method known from the prior art. In order to effect the required relative movement between the laser beam and cover, the cover is advantageously moved along in a determined transporting direction under the stationary laser at a transporting speed of up to 200 mm/s, so that the laser describes the desired line of weakening on the airbag cover. That is, the cover is transported continuously regardless of whether or not the laser is operating. This results in the deep pocket holes 4.2 which are generated with an appreciably higher quantity of laser pulses than the shallow pocket holes 4.1 with a greater extension in the transporting direction. In order for the center spacing $d_1$ and $d_2$ to be constant not only between the pocket holes 4 within a group of pocket holes, but also between two pocket holes 4 of adjacent groups, the laser is controlled in such a way that the time between switching off the laser after a pocket hole is made and switching on the laser to generate another pocket hole is maintained constant. This increases the reproducibility of the tear strength along the line of weakening.

While the foregoing description and drawings represent the present invention, it will be obvious to those skilled in the art that various changes may be made therein without departing from the true spirit and scope of the present invention.

| | Reference Numbers |
|---|---|
| 1 | substrate layer |
| 2 | foamed material layer |
| 3 | decorative layer |
| 4 | pocket holes |
| 4.1 | shallow pocket holes |
| 4.2 | deep pocket holes |
| a | length of the first group of pocket holes |
| b | length of the second group of pocket holes |
| c | section length |
| d | center spacing |
| e | residual wall thickness |
| f | sink-in depth |
| x | quantity of shallow holes |
| y | quantity of deep holes |

What is claimed is:

1. A method for introducing a line of weakening with a low opening resistance in an airbag cover, having a substrate layer, a foamed material layer and a decorative layer;

said method comprising:

forming a row of pocket holes therein by laser radiation, and further including the steps of:

alternately, generating first groups of pocket holes with a length (a) and with a quantity (x) of shallow pocket holes only in the substrate layer and generating second groups of pocket holes with a length (b) and with a quantity (y) of deep pocket holes through the substrate layer and through the foamed material layer into the decorative layer; and retaining the foamed material layer in the area of the first groups of pocket holes as a supporting layer.

2. The method according to claim 1, wherein the second groups of pocket holes are generated with a greater length (b) than the length of the first groups of pocket holes.

3. The method according to claim 1, wherein the deep pocket holes are generated in a greater quantity than the shallow pocket holes.

4. The method according to claim 1, wherein the pocket holes are generated in an overlapping manner.

5. The method according to claim 1, wherein the deep pocket holes are generated up to a residual wall thickness (e) in the decorative layer of less than one tenth of a millimeter.

6. The method according to claim 1, wherein the laser radiation is pulsed and controlled in such a way that the center spacing (d) of all pocket holes relative to one another is constant.

7. An airbag cover with a line of weakening having a low opening resistance, comprising:

a substrate layer;

a foamed material layer and a decorative layer; and a line-shaped arrangement of pocket holes which extends in the airbag cover and forms the line of weakening;

said arrangement of the pocket holes comprises alternately arranged first groups of pocket holes with a length (a) and a quantity (x) of shallow pocket holes and second groups of pocket holes of a length (b) and a quantity (y) of deep pocket holes, and the shallow pocket holes only project into the substrate layer and the deep pocket holes project through the substrate layer and foamed material layer into the decorative layer, so that the foamed material layer remains in the area of the first groups of pocket holes as a supporting layer.

* * * * *